(12) United States Patent
Rockett

(10) Patent No.: US 12,187,657 B2
(45) Date of Patent: Jan. 7, 2025

(54) GLASS OVERLAY FOR CONCRETE

(71) Applicant: Bart Rockett, Marlton, NJ (US)

(72) Inventor: Bart Rockett, Marlton, NJ (US)

( * ) Notice: Subject to any disclaimer, the term of this patent is extended or adjusted under 35 U.S.C. 154(b) by 327 days.

(21) Appl. No.: 17/539,317

(22) Filed: Dec. 1, 2021

(65) Prior Publication Data

US 2022/0177381 A1   Jun. 9, 2022

Related U.S. Application Data

(60) Provisional application No. 63/122,035, filed on Dec. 7, 2020.

(51) Int. Cl.
| | | |
|---|---|---|
| *C04B 41/71* | (2006.01) | |
| *C04B 41/00* | (2006.01) | |
| *C04B 41/45* | (2006.01) | |
| *C04B 41/48* | (2006.01) | |
| *C04B 41/50* | (2006.01) | |
| *C04B 41/52* | (2006.01) | |
| *C04B 41/53* | (2006.01) | |
| *C04B 41/63* | (2006.01) | |
| *C04B 41/65* | (2006.01) | |
| *C04B 41/72* | (2006.01) | |

(52) U.S. Cl.
CPC ............ *C04B 41/71* (2013.01); *C04B 41/009* (2013.01); *C04B 41/4576* (2013.01); *C04B 41/4853* (2013.01); *C04B 41/5081* (2013.01); *C04B 41/522* (2013.01); *C04B 41/533* (2013.01); *C04B 41/63* (2013.01); *C04B 41/65* (2013.01); *C04B 41/72* (2013.01)

(58) Field of Classification Search
CPC ... C04B 41/71; C04B 41/009; C04B 41/4576; C04B 41/4853; C04B 41/5081; C04B 41/522; C04B 41/533; C04B 41/63; C04B 41/65; C04B 41/72
See application file for complete search history.

(56) References Cited

U.S. PATENT DOCUMENTS

| | | | | |
|---|---|---|---|---|
| 6,564,632 | B2 * | 5/2003 | Ross, Jr. | ................. G01F 23/34 |
| | | | | 73/317 |
| 8,381,483 | B1 * | 2/2013 | Goldman | ............ E04G 23/0285 |
| | | | | 427/403 |
| 2002/0064637 | A1 * | 5/2002 | Brown | .................. C04B 41/009 |
| | | | | 427/407.1 |
| 2005/0175782 | A1 * | 8/2005 | Graf | ........................ E04F 15/12 |
| | | | | 106/816 |
| 2006/0178463 | A1 * | 8/2006 | Sacks | ....................... C08K 3/36 |
| | | | | 524/492 |

(Continued)

FOREIGN PATENT DOCUMENTS

CN          108069640 A  *  5/2018

*Primary Examiner* — Alex B Efta
(74) *Attorney, Agent, or Firm* — DLA Piper LLP (US)

(57) ABSTRACT

An improved terrazzo process for applying terrazzo to an existing concrete surface comprising preparing the concrete surface, applying two layers of a primer agent, applying a terrazzo layer comprising calcium sulfoaluminate (CSA) cement, white milk glass, and one or more of broken mirrored glass and colored glass, cutting the terrazzo layer, applying a concrete densifier such that the concrete densifier penetrates into at least a portion of the concrete substrate, and grinding and polishing the densified terrazzo layer.

20 Claims, 13 Drawing Sheets

(56) References Cited

U.S. PATENT DOCUMENTS

| | | | |
|---|---|---|---|
| 2012/0011794 A1* | 1/2012 | McCorkle | E04B 1/483 52/396.02 |
| 2014/0099496 A1* | 4/2014 | Attard | E04C 5/07 428/221 |
| 2022/0098102 A1* | 3/2022 | Xu | C04B 28/10 |

* cited by examiner

US 12,187,657 B2

GLASS OVERLAY FOR CONCRETE

TECHNICAL FIELD

The present disclosure generally relates to concrete overlays, and, more particularly, to an improved process for creating terrazzo floors, patios, and horizontal panels on existing concrete surfaces.

BACKGROUND

Terrazzo is a composite material, poured in place or precast, which is used for floor and wall treatments. It typically consists of chips of marble, quartz, granite, glass, or other suitable material, poured with a cementitious binder (for chemical binding), polymeric (for physical binding), or a combination of both. Terrazzo floors and panels are used extensively today for architectural purposes. Terrazzo floors and panels are used extensively today for architectural purposes.

SUMMARY

A method of forming a glass overlay on an existing concrete substrate. The method may include treating an upper surface of the concrete substrate by physical means. One or more cracks in the concrete substrate may be filled with a first joint filler. An anti-fracture membrane may be applied over the joint filler. A first primer layer may be applied over the upper surface, the joint filler, and the anti-fracture membrane. A second primer layer may be applied over the first primer layer. The second primer layer may be seeded before it hardens to form a seeded primer layer. A terrazzo layer may be applied over the seeded primer layer. The terrazzo layer may be composed of calcium sulfoaluminate (CSA) cement, white milk glass, and one or more of broken mirrored glass and colored glass. Cuts may be formed in the terrazzo layer. The cuts may be filled with a second joint filler. A grinding process may be performed to the terrazzo layer and the second joint filler. A concrete densifier may be applied to the grinded terrazzo layer and the second joint filler, such that the concrete densifier penetrates into at least a portion of the concrete substrate. The densified terrazzo layer and second joint filler may be polished. A sealer may be applied to the polished terrazzo layer and second joint filler.

BRIEF DESCRIPTION OF THE DRAWINGS

The drawings described below are for illustration purposes only. The drawings are not intended to limit the scope of the present disclosure.

DETAILED DESCRIPTION

Figure 1:
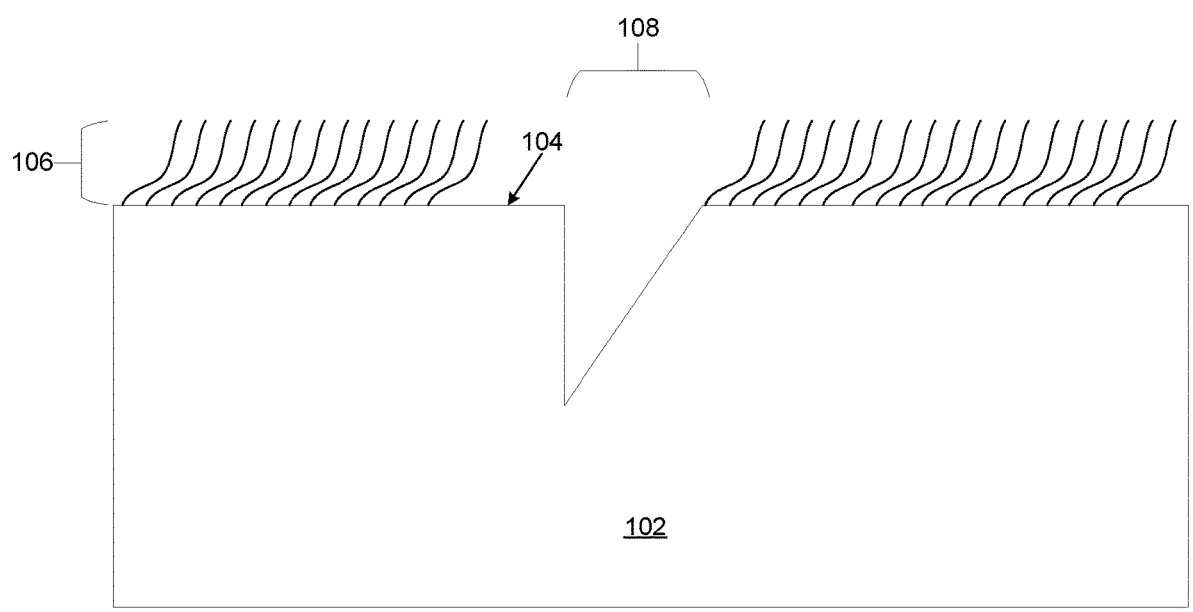
FIG. 1 is a cross-sectional diagram of a concrete substrate.

Today, terrazzo floors are usually constructed by embedding marble chips and other aggregate (e.g., colored rock or pebbles, recycled glass, shaped metal, bolts and screws, and medallions) in concrete and then exposing the marble chips and other fine aggregates on the surface of finished concrete or by grinding and polishing the concrete surface. Conventional marble-chip, cementious terrazzo, rustic terrazzo, requires three layers of materials. First, a solid, level concrete pad or flooring foundation, 3 to 4 inches thick, is laid. Before the concrete has set up, the concrete surface is raked to give the surface bite for the next step. Then, and before the concrete has set up, a 1-inch layer of sandy concrete topping is applied to the raked concrete surface. For the final layer, a mixture of cement and fine aggregate is blended and placed on the top of the concrete mortar topping layer before it sets up to from a surface layer. While this surface layer is still wet, additional aggregate is broadcast on the surface to insure adequate coverage and uniform density of chips. A lightweight roller is then rolled over the entire surface to give a flat surface. When design elements are incorporated in the terrazzo finish, the different color mixtures of concrete and aggregate are prepared and then applied over the mortar topping layer in prescribed sections to create the design. Then matching aggregate is hand seeded into the different sections to achieve a uniform density of aggregate and color. When the terrazzo is thoroughly dry, the upper surface is ground with a terrazzo grinder to give a smooth even finish. The surface is then cleaned, polished with a terrazzo polisher, and/or sealed.

Terrazzo design flooring is very labor intensive. In addition, a major limitation to conventional cementious terrazzo is that it may only be applied to a fresh, new, clean concrete surface, (i.e., the raked concrete surface of a new pad or flooring). The installation of exterior cementious terrazzo on the surface of an existing concrete pad or flooring is very difficult. Cracking and delamination are common problems. Because of such problems, most construction companies will refuse to apply terrazzo over an existing concrete surface, or will refuse to furnish a warranty for a terrazzo finish over an existing concrete surface.

The following description includes a process that allows users to apply a terrazzo finish to an existing horizontal concrete surface with an insignificant thickness and weight penalty. Thus, the present method permits the application of a terrazzo finish to an existing concrete structure and does not require the laying of a new concrete pad or floor. In addition, the composition of the terrazzo and the unique process described herein may provide a terrazzo overlay that has a visually pleasing three-dimensional pattern that is deeper than conventional products. Further, the curing process described herein may reduce cracking in both the terrazzo overlay and the underlying concrete substrate and may improve the strength of the concrete substrate.

Referring now to FIG. 1, a cross-sectional diagram of a concrete substrate 102 is shown. The concrete substrate 102 may be substantially rigid concrete structure with a top surface 104. The concrete substrate 102 may be, for example, a pavement, a side walk, a mall decking, a building floor, or the like. In an example, the top surface 104 may be contaminated with layers of dirt and other material 106. Further, the concrete substrate 102 may include one or more cracks 108.

The top surface 104 may be cleaned to virgin concrete. The top surface 104 may be swept clean of all loose debris and then physically treated or mechanically contoured to expose the upper layer of the concrete substrate together and remove all dirt, paint, oil, grease, and the like (collectively dirt 106 herein), to expose a fresh clean virgin surface of the concrete substrate 102. A virgin concrete surface is a concrete surface that has never been previously exposed as a surface. Although more concrete can be removed, in an example, less than a 1/16 inch layer of concrete may be removed. The top surface 104 may be treated with one or more of a sander, a mechanical wire brush, a grinder, a shot blaster for shot blasting, glass bead gun, sand blaster, mechanical scrapper, high pressure water jet, or other devices for scarifying the concrete surface. Any device that will remove dirt, paint, tar, asphalt, wax, oil grease, latex compounds, form release agents, laitance, loose toppings, foreign substances and any other material that will interfere with bonding may be used. The treatment may open the pores of the concrete substrate 102 for the deposition of layers described below.

Figure 2:
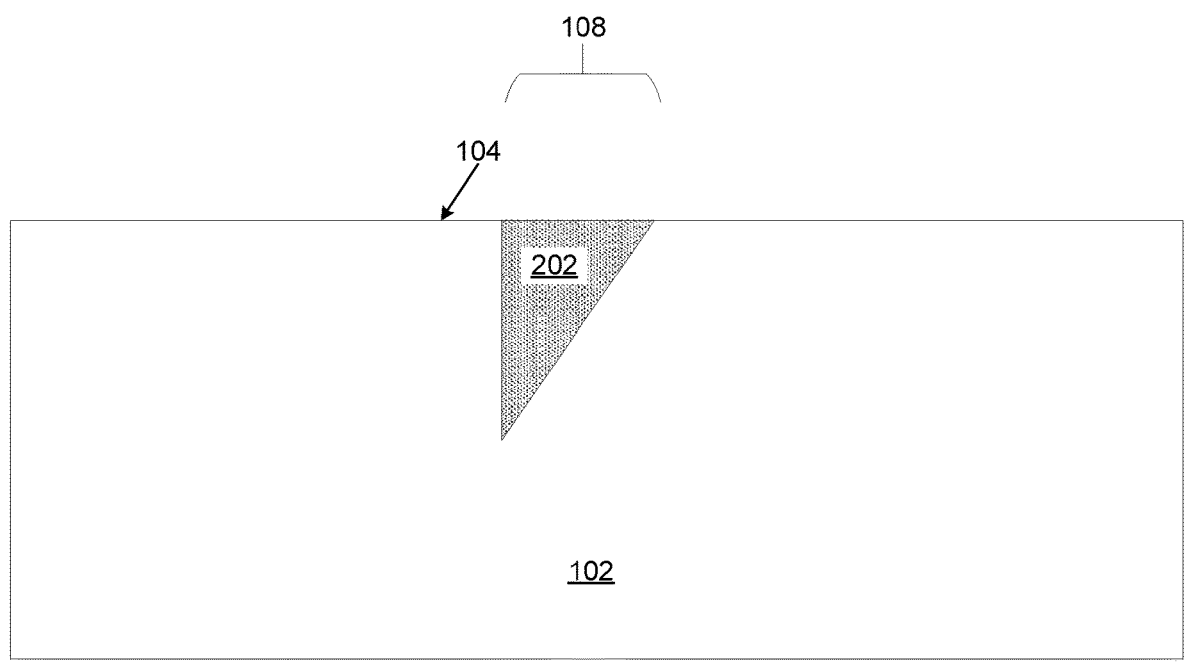
FIG. 2 is a cross-sectional diagram of the concrete substrate after it is treated by one or more physical means and one or more cracks are filled.

Referring now to FIG. 2, a cross-sectional diagram of the concrete substrate 102 after it is treated by one or more physical means. The dirt 106 shown in FIG. 1 may be removed. The treated top surface 104 may be swept free of all dust and particles. In an example, it may be vacuumed to remove all dust and particles.

The one or more cracks 108 in the concrete substrate 102 may be filled with a joint filler 202. The joint filler 202 may be a conventional joint filler composed of polyurea. In an example, the joint filler 202 may be deposited such an upper surface of the joint filler is substantially flush with the top surface 104. In another example, the joint filler 202 may be deposited such that the upper surface of the joint filler is approximately ½ inch above the top surface 104.

Figure 3:
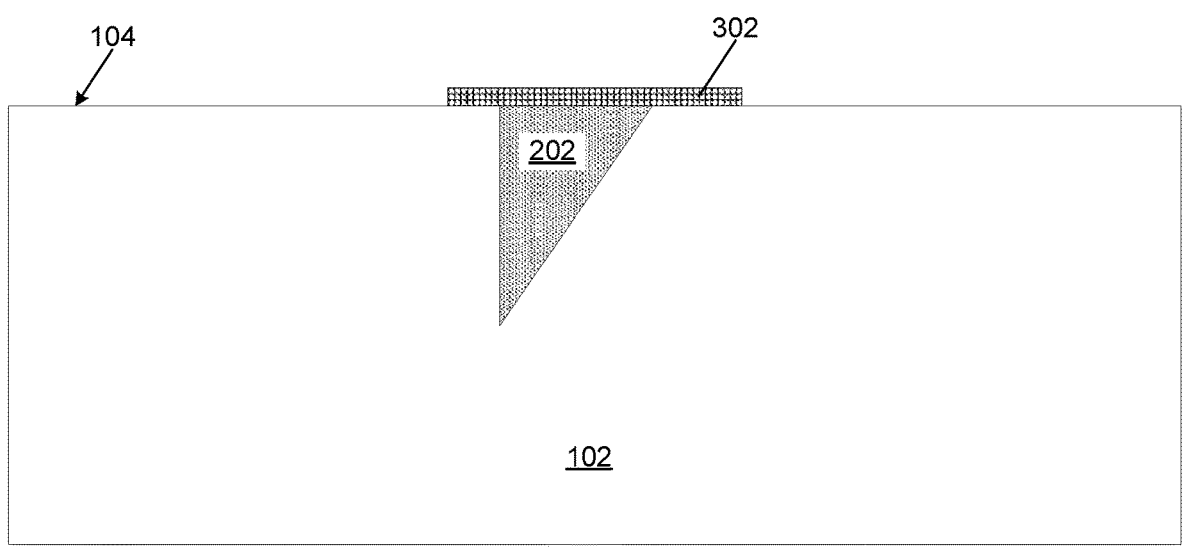
FIG. 3 is a cross-sectional diagram illustrating the application of an anti-fracture membrane.

Referring now to FIG. 3, a cross-sectional diagram illustrating the application of an anti-fracture membrane 302 is shown. The anti-fracture membrane 302 may be applied over the joint filler 202. The anti-fracture membrane 302 may be a conventional product composed of one or more of a mesh, a sheet, a liquid, and Portland cement-based materials. In an example, the anti-fracture membrane 302 may have a thickness ranging from approximately 12 mm to approximately 15 mm.

Figure 4:
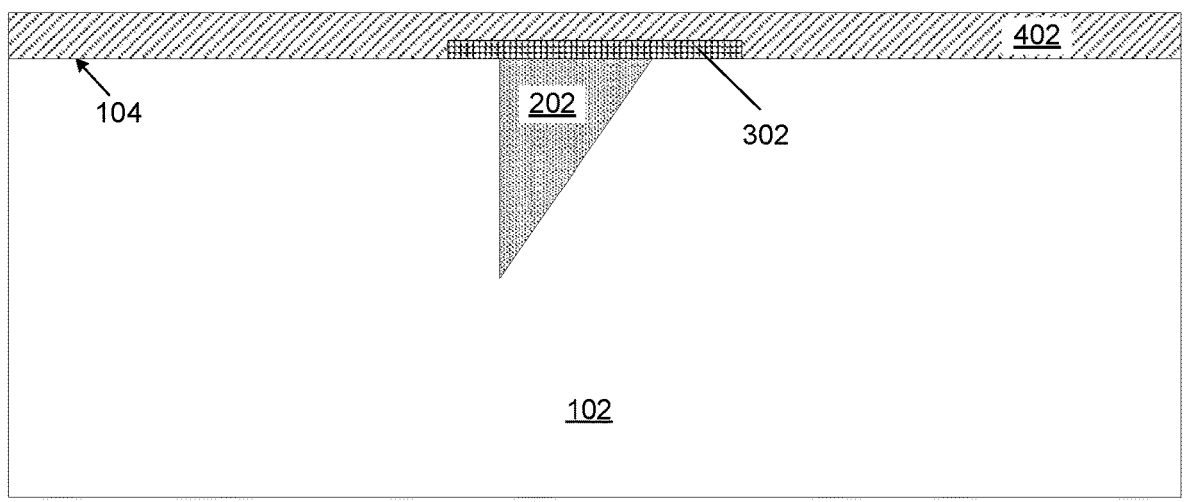
FIG. 4 is a cross-sectional diagram illustrating the application of a first primer layer.

Referring now to FIG. 4, a cross-sectional diagram illustrating the application of a first primer layer 402 is shown. The first primer layer 402 may be composed of a conventional epoxy material. For example, the first primer layer 402 may be composed of an epoxy moisture barrier and consolidator, such as Sika® MB. The first primer layer 402 may have a thickness ranging from approximately 12 mm to approximately 15 mm. In an example, the first primer layer 402 may be applied using a roller rather than a squeegee as this may better work the material into the surface of the concrete substrate 102. An additional amount of the first primer layer 402 may be applied to the anti-fracture membrane 302.

Figure 5:
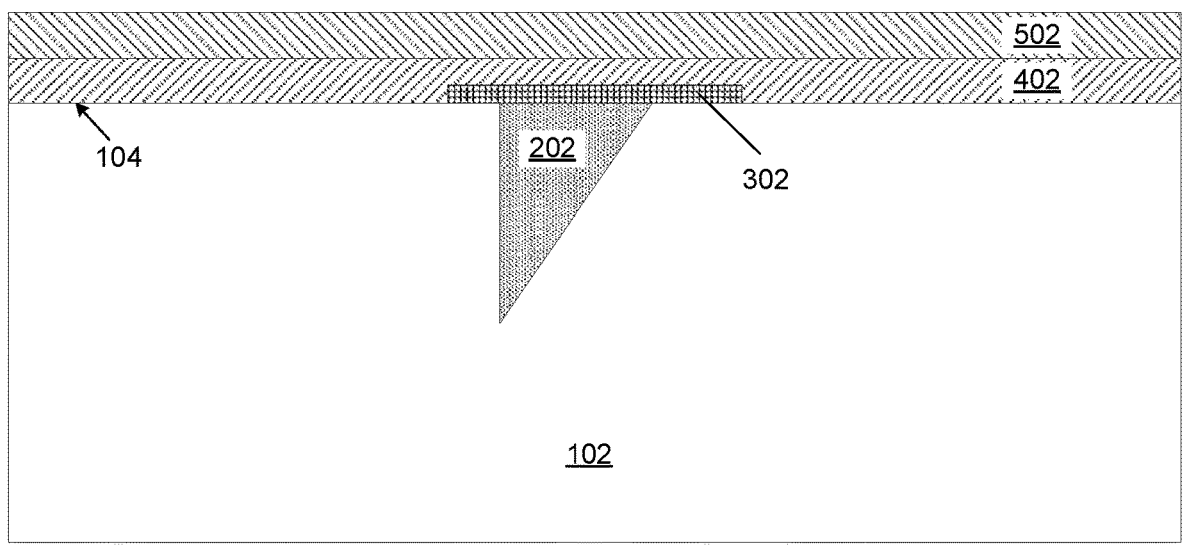
FIG. 5 is a cross-sectional diagram illustrating the application of a second primer layer.

Referring now to FIG. 5, a cross-sectional diagram illustrating the application of a second primer layer 502 is shown. The second primer layer 502 may be applied directly to the first primer layer 402 within approximately 12 hours to approximately 24 hours after the first primer layer 502 is applied, but no longer than approximately 18 hours. The second primer layer 502 may be composed of the same material as the first primer layer 402, or it may be a different epoxy material/composition. The second primer layer 502 may have a thickness ranging from approximately 12 mm to approximately 15 mm.

Figure 6:
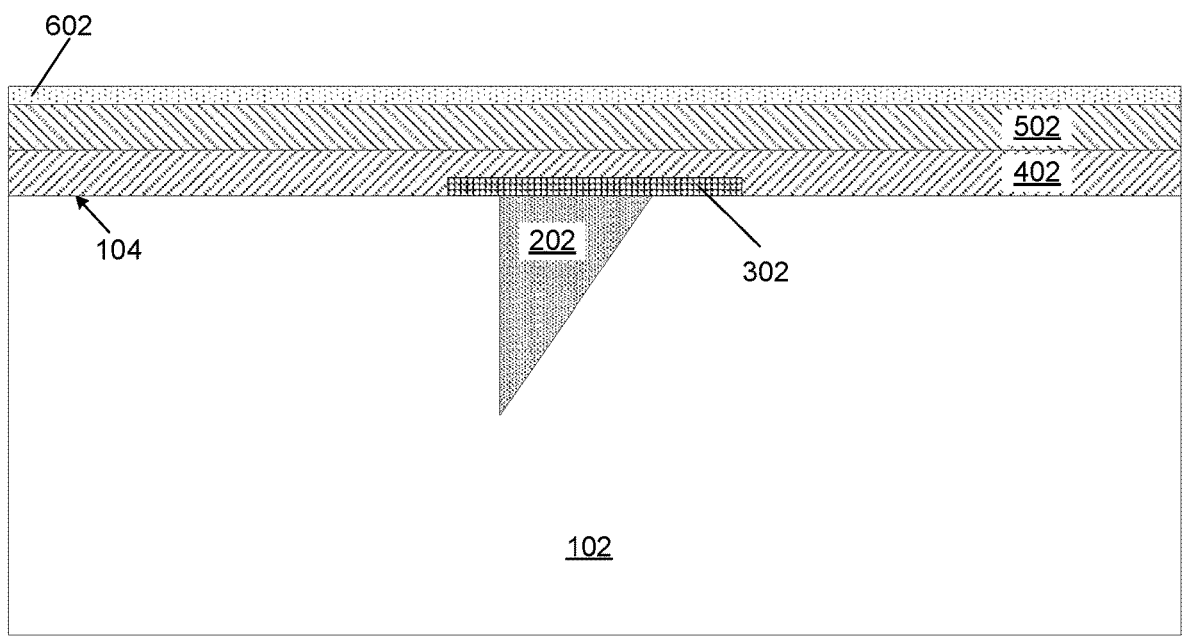
FIG. 6 is a cross-sectional diagram illustrating the application of a seed layer.

Referring now to FIG. 6, a cross-sectional diagram illustrating the application of a seed layer 602 is shown. The seed layer 602 may be composed of shot formed on the second primer layer 502 using, for example, sand blasting. In an example, the seed layer 602 may be composed of 0/0 grit sand/shot. The seed layer 602 may be formed while the second primer layer 502 is still wet (i.e., before the second primer layer 502 hardens). The seed layer 602 may be applied to ensure even distribution across the surface of the second primer layer 502. After deposition, the seed layer 602 and the second primer layer 502 may be allowed to dry/cure for approximately 8 hours. After the drying process, excess sand/shot may be removed by, for example, sweeping and/or vacuuming.

Figure 7:
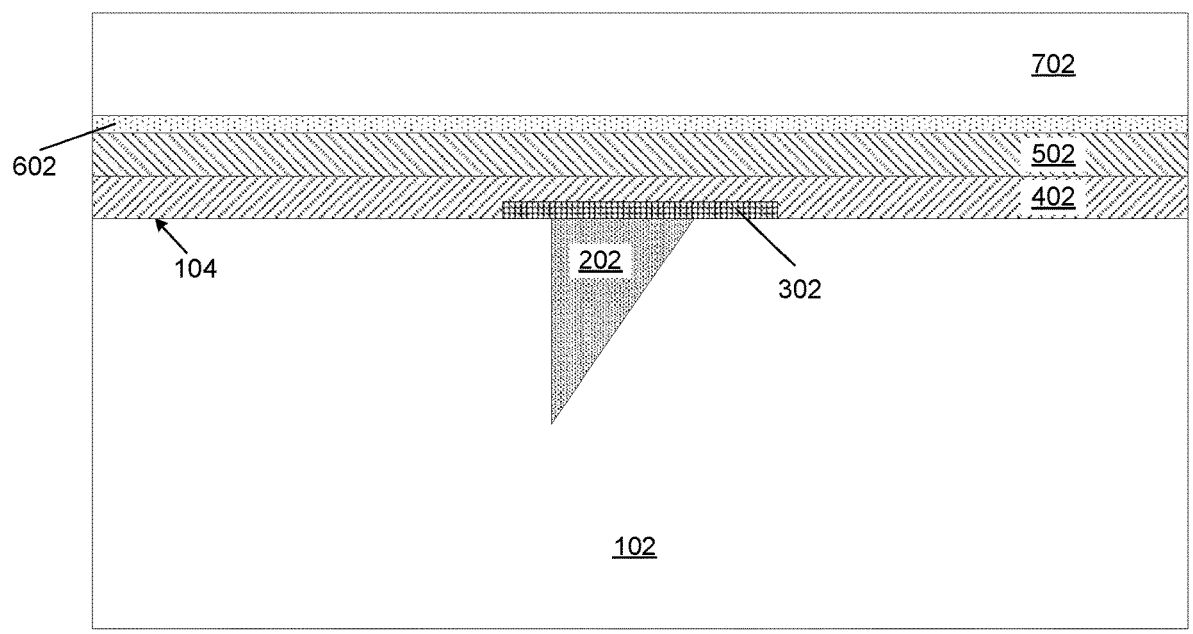
FIG. 7 is a cross-sectional diagram illustrating the application of a terrazzo layer.

Referring now to FIG. 7, a cross-sectional diagram illustrating the application of a terrazzo layer 702 is shown. The terrazzo layer 702 may be composed of a cement, white milk glass, and one or more of broken mirrored glass and colored glass. In an example, the cement may include one or more of Portland cement, calcium sulfoaluminate (CSA) cement, and Calcium aluminate cement (CAC). For example, the terrazzo layer 702 may have the following compositions by weight percent (w %).

TABLE 1

Example Compositions of the Terrazzo Layer (w %)

| Ingredient | Example 1 | Example 2 | Example 3 |
|---|---|---|---|
| CSA Cement | 57% | 57% | 57% |
| Milk Glass | 29% | 29% | 29% |
| Mirrored Glass | 14% | 0 | 7% |
| Colored Class | 0 | 14% | 7% |

In an example, the terrazzo layer 702 may be composed of 100 lbs of white CSA cement, 50 lbs of white milk glass, and 25 lbs of broken mirrored glass. One or more of the milk glass, the broken mirrored glass, and the colored glass may be recycled/reclaimed glass. In an example, the glasses used may be regional post-consumer glass. In an example, the glasses used may be pieces having a diameter of approximately ¼ inch.

The terrazzo layer 702 may be formed by mixing the ingredients for approximately 3 minutes in, for example, a conventional concrete mixer. In example, the white CSA cement may be added to a volume of water (approximately 1 quart to every 10 lbs of white CSA) and mixed thoroughly for approximately 90 seconds. The chosen glasses may be added next. The white glass may be added first, followed by the mirrored glass and/or the colored glass. The mixture may be continuously stirred so as to prevent clumping of the chosen glasses.

After the materials are thoroughly mixed, the terrazzo layer 702 may be poured onto the seed layer 602. In an example, the terrazzo layer 702 may be poured such that the glass aggregate is spread evenly over the concrete substrate 102, especially in corners and edges. The terrazzo layer 702 may be poured so that is has a thickness of approximately ¾ inch. A gage rake may be uses to smoothing and flatting the terrazzo layer 702.

Figure 8:
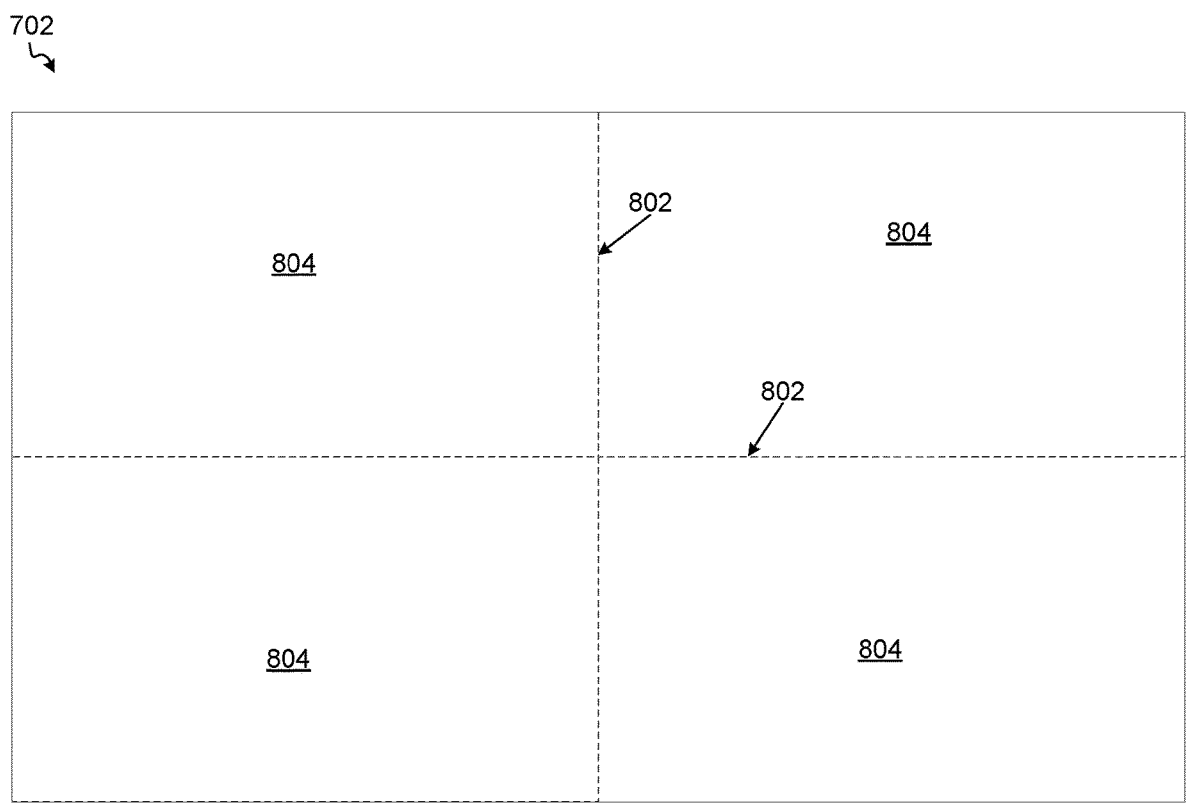
FIG. 8 is a top view of the terrazzo layer 702 illustrating one or more cuts.

Referring now to FIG. 8, a top view of the terrazzo layer 702 illustrating one or more cuts 802 is shown. After the terrazzo layer 702 is formed, one or more cuts 802 may be formed. The one or more cuts 802 may be formed using a saw and may be approximately ½ inch deep. The one or more cuts may be formed within approximately 12 hours after the terrazzo layer 702 is formed. The one or more cuts 802 may form one or more areas 804 in the terrazzo layer 702. The one or more areas 804 may have an area of approximately 100 square feet. The one or more cuts 802 may be strategically placed to relieve stress from the floor and prevent cracking.

Figure 9:
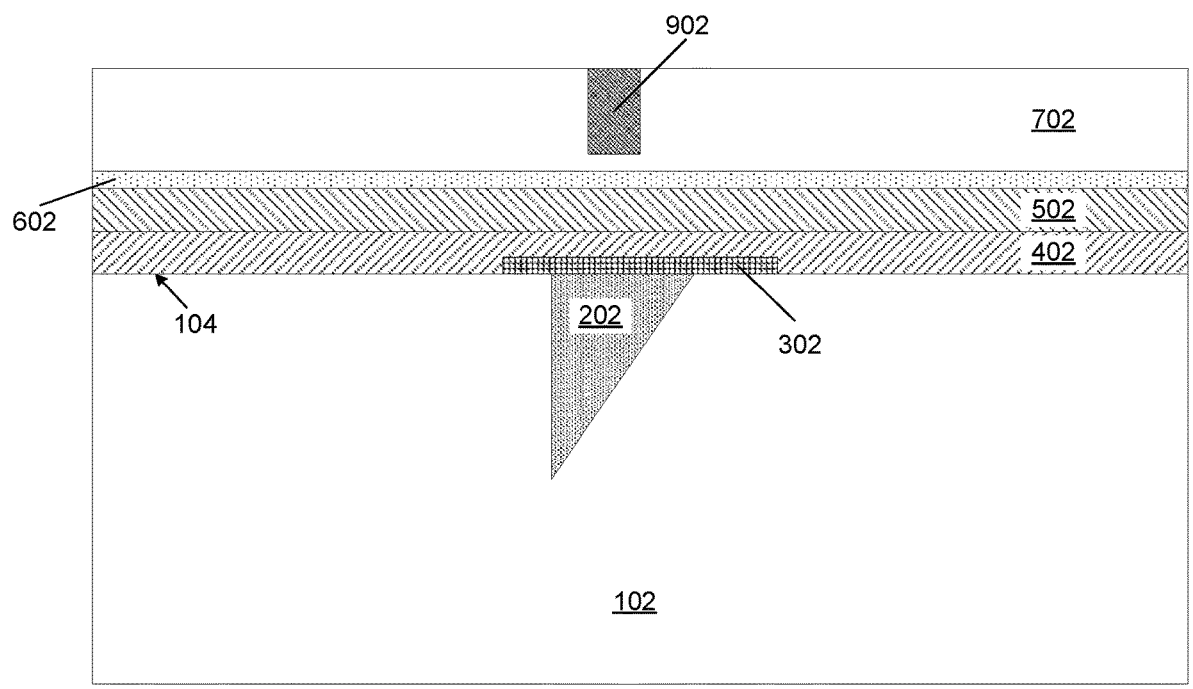
FIG. 9 is a cross-sectional diagram illustrating the filling of the one or more cuts.

Referring now to FIG. 9, a cross-sectional diagram illustrating the filling of the one or more cuts 802 is shown. In an example, the one or more cuts may be filled with a joint filler 902. The joint filler 902 may be a conventional joint filler composed of polyurea. The joint filler 902 may have the same composition of the joint filler 202 or it may be different. In an example, the joint filler 202 may be deposited such an upper surface of the joint filler is substantially flush with an upper surface of the terrazzo layer 702. Although not shown in FIG. 9, the one or more cuts 802 may be overfilled with the joint filler 902 by approximately ½ inch to ensure a level joint after grinding.

Figure 10:
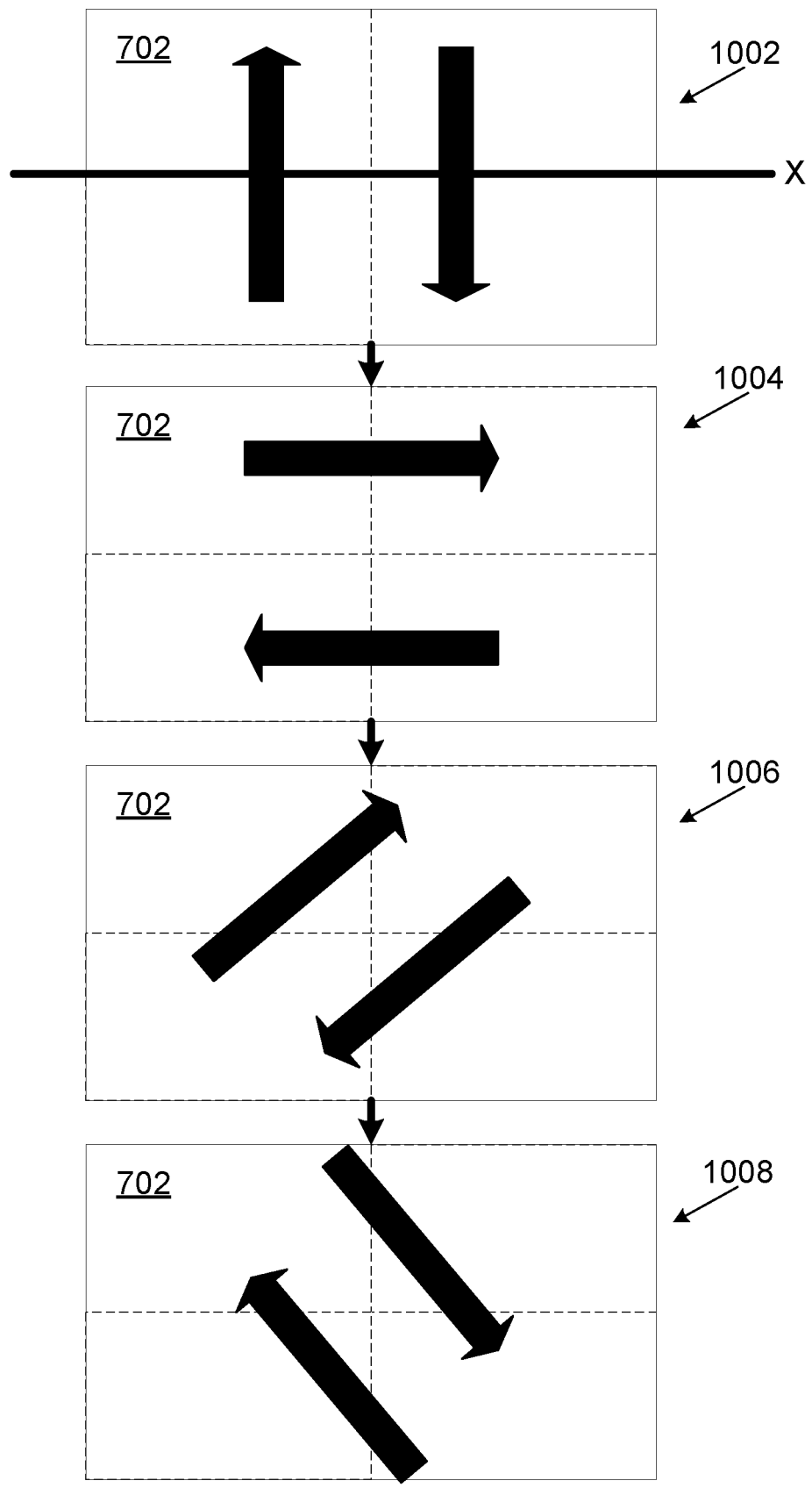
FIG. 10 is a top-view pictorial flow diagram illustrating a grinding pattern for the terrazzo layer.

Referring now to FIG. 10, a top-view pictorial flow diagram illustrating a grinding pattern a grinding process for the terrazzo layer 702 is shown. In a first grinding step, a grinding disc composed of 16/20 diamond grit may be used. The grinding disc may run over the terrazzo layer 702 in four passes. A first pass 1002 may be back and forth perpendicular (90 degrees) to a horizontal axis X. A second pass 1004 may be back and forth along the horizontal axis X. A third pass 1006 may be back and forth at a 45 degree angle from the horizontal axis X. A fourth pass 1008 may be back and forth at a 135 degree angle from the horizontal axis X.

In a second grinding step, a series of metal bond grinding discs may be used. For example, passes may be made using 30, 70, and 120 grit metal bond grinding discs. For each metal bond grinding discs used, four passes may be made as described above. The first pass 1002 may be back and forth perpendicular (90 degrees) to a horizontal axis X. The second pass 1004 may be back and forth along the horizontal axis X. The third pass 1006 may be back and forth at a 45 degree angle from the horizontal axis X. The fourth pass 1008 may be back and forth at a 135 degree angle from the horizontal axis X.

In a third grinding step, a series of ceramic diamond grinding discs may be used. For example, passes may be made using 50, 100, and 200 grit ceramic diamond grinding discs. For each ceramic diamond grinding discs used, four passes may be made as described above. The first pass 1002 may be back and forth perpendicular (90 degrees) to a horizontal axis X. The second pass 1004 may be back and forth along the horizontal axis X. The third pass 1006 may be back and forth at a 45 degree angle from the horizontal axis X. The fourth pass 1008 may be back and forth at a 135 degree angle from the horizontal axis X. In an example, grinding may be done in opposite directions between each ceramic diamond disc used.

In an example, the grinding process may remove ¼ inch thickness from the terrazzo layer 702 and the joint filler 902. The terrazzo layer 702 may be grouted one or more times during the grinding process. For example, the terrazzo layer 702 may be ground between 100-200 passes and again at 200 passes. The edges of the terrazzo layer 702 may be done by hand prior to machine grinding. After the grinding process, excess dust/material may be removed by, for example, sweeping and/or vacuuming.

Figure 11:
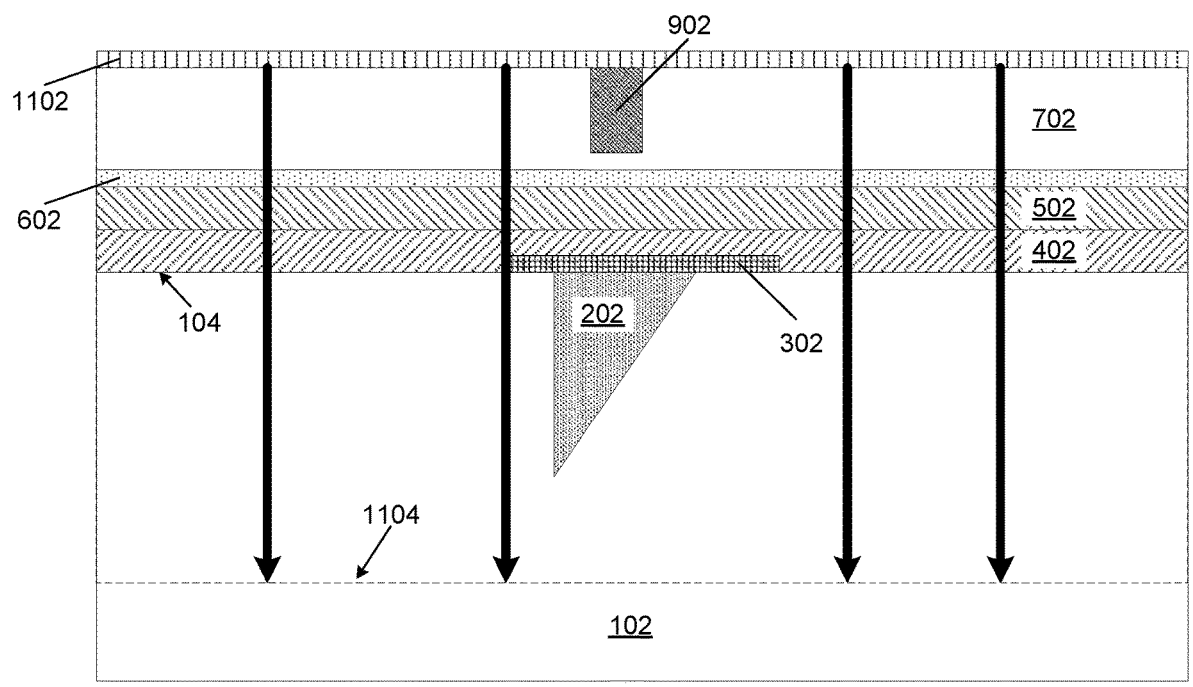
FIG. 11 is a cross-sectional diagram illustrating the application of a concrete densifier.

Referring now to FIG. 11, a cross-sectional diagram illustrating the application of a concrete densifier 1102 is shown. The concrete densifier 1102 may be a lithium based concrete densifier, such as the Formula One™ Lithium Densifier MP sold by SCOFILED®. The concrete densifier 1102 may be a penetrating semi-transparent to transparent liquid that reacts with concrete to improve abrasion resistance, gloss retention, surface compressive strength, and dusting. The concrete densifier 1102 may be applied such that it saturates the terrazzo layer and penetrates into the concrete substrate 102. After it is applied, the concrete densifier 1102 may be moved around, for example by a broom, and agitated for approximately 30 minutes. After the period of agitation, the concrete densifier 1102 may be allowed to dry for approximately 6 hours.

The concrete densifier 1102 may penetrate through the terrazzo layer 702, the seed layer 602, the second primer layer 502, and the first primer layer 402 into the concrete substrate 102 up to a certain depth 1104. In conventional techniques, a densifier may be applied to a terrazzo layer in a volume such that it penetrates approximately $\frac{1}{16}^{th}$ of an inch. In an example, the depth 1104 may be greater than approximately 3 inches. In some examples, the concrete densifier 1102 may penetrate through an entire thickness of the concrete substrate 102. This may result in a more robust and aesthetically pleasing final product.

After the concrete densifier 1102 has dried, it may be polished with one or more ceramic discs. In an example, the concrete densifier may be polished with a 400 grit ceramic disc. For each ceramic disc used, four passes may be made as described above. The first pass 1002 may be back and forth perpendicular (90 degrees) to a horizontal axis X. The second pass 1004 may be back and forth along the horizontal axis X. The third pass 1006 may be back and forth at a 45 degree angle from the horizontal axis X. The fourth pass 1008 may be back and forth at a 135 degree angle from the horizontal axis X.

Figure 12:
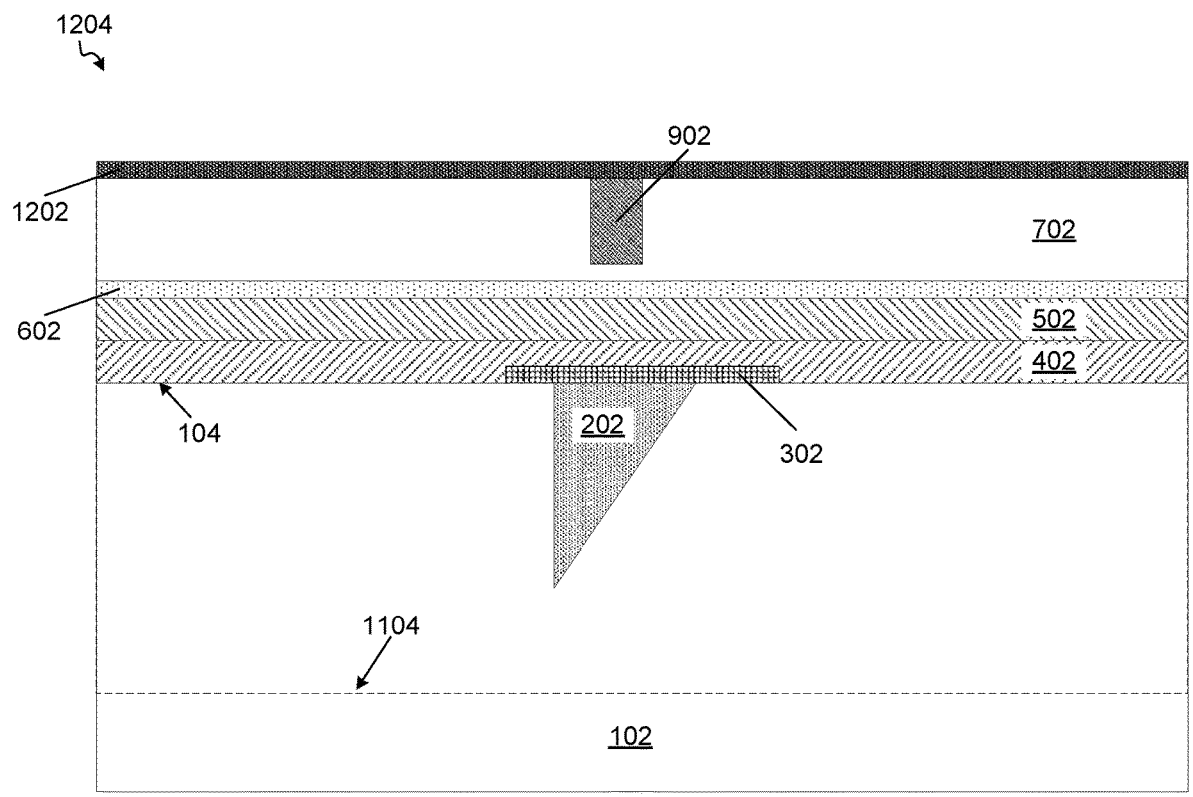
FIG. 12 is a cross-sectional diagram illustrating the application of a sealer.

Referring now to FIG. 12, a cross-sectional diagram illustrating the application of a sealer 1202 to form a final terrazzo product 1204 is shown. The sealer 1202 may be composed of a conventional silicanate sealer and/or stain guard and may be applied using conventional techniques. In an example, approximately one gallon of sealant 1202 may be used per approximately 1500 square feet of terrazzo. The sealant 1202 may have a thickness ranging from approximately 0.1 mm to approximately 0.5 mm. After the sealer 1202 is applied, it may be buffed with, for example, a white buffing pad.

Figure 13:
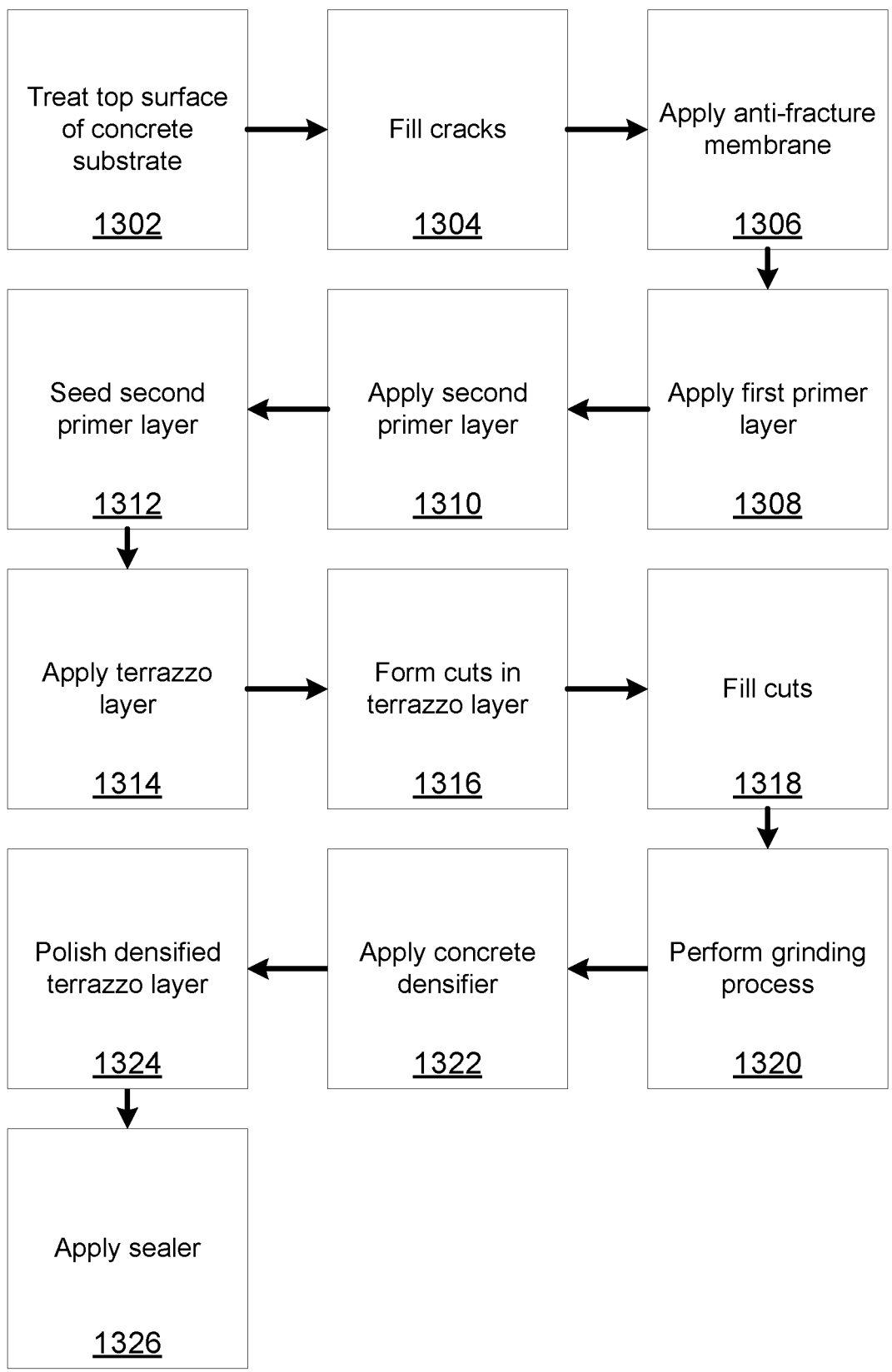
FIG. 13 is a flow chart illustrating the process of forming of a terrazzo product.

Referring now to FIG. 13, a flow chart illustrating the process of forming of the terrazzo product 1204 is shown. In step 1302, the top surface 104 of the concrete substrate 102 may be treated. In step 1304, the one or more cracks 108 may be filed with the joint filler 202. In step 1306, the anti-fracture membrane 302 may be applied over the joint filler 202. In step 1308, the first primer layer 402 may be formed. In step 1310, the second primer layer 502 may be formed. In step 1312, the second primer layer 502 may be seeded with a seed layer 602. In step 1314, the terrazzo layer

702 may be formed on the seed layer 602. In step 1316, one or more cuts 802 may be formed in the terrazzo layer 702. In step 1318, the one or more cuts 802 may be formed with a joint filler 902. In step 1320, a grinding process may be performed to the terrazzo layer 702. In step 1312, the concrete densifier 1102 may be formed. In step 1324, the densified terrazzo layer 702 may be polished. In step 1326, a sealer 1202 may be applied to the polished and densified terrazzo layer 702.

Although features and elements are described above in particular combinations, one of ordinary skill in the art will appreciate that each feature or element can be used alone or in any combination with the other features and elements.

The invention claimed is:

1. A method of forming a glass overlay on an existing concrete substrate, the method comprising:
   treating an upper surface of the concrete substrate by physical means;
   filling one or more cracks in the concrete substrate with a first joint filler;
   applying an anti-fracture membrane over the first joint filler;
   applying a first primer layer over the upper surface, the first joint filler, and the anti-fracture membrane;
   applying a second primer layer over the first primer layer;
   seeding the second primer layer with one or more of sand and shot before it hardens to form a seeded primer layer;
   applying a terrazzo layer over the seeded primer layer after it has hardened, the terrazzo layer comprising, by weight, 57% calcium sulfoaluminate (CSA) cement, 29% white milk glass, and 14% of one or more of broken mirrored glass and colored glass;
   forming cuts in the terrazzo layer;
   filling the cuts with a second joint filler;
   performing a grinding process to the terrazzo layer and the second joint filler;
   applying a concrete densifier to the grinded terrazzo layer and the second joint filler, such that the concrete densifier penetrates into at least a portion of the concrete substrate;
   polishing the densified terrazzo layer and second joint filler; and
   applying a sealer to the polished terrazzo layer and second joint filler.

2. The method of claim 1, wherein the physical means comprising one or more of shot blasting and grinding.

3. The method of claim 1, wherein the first joint filler comprises a polyurea joint filler.

4. The method of claim 1, wherein the first joint filler and the second joint filler have a similar composition.

5. The method of claim 1, wherein the first joint filler has an upper surface that is substantially flush with the upper surface of the concrete substrate.

6. The method of claim 1, wherein the first primer layer is applied with a roller.

7. The method of claim 1, wherein the first primer layer and the second primer layer comprise an epoxy material.

8. The method of claim 1, wherein the 14% of the one or more of broken mirrored glass and colored glass consists of broken mirrored glass.

9. The method of claim 1, wherein the 14% of the one or more of broken mirrored glass and colored glass consists of colored glass.

10. The method of claim 1, wherein the 14% of the one or more of broken mirrored glass and colored glass consists of 7% of the broken mirrored glass and 7% of the colored glass.

11. The method of claim 1, further comprising:
    forming the terrazzo layer by:
       adding the CSA to a volume of water in a mixer,
       mixing the CSA and water for approximately 90 seconds,
       adding the white glass to the mixer, and
       adding the one or more of the broken mirrored glass and the colored glass to the mixer.

12. The method of claim 1, wherein one or more of the white glass, the broken mirrored glass, and the colored glass comprise pieces having a diameter of approximately ¼ inch.

13. The method of claim 1, wherein one or more of the white glass, the broken mirrored glass, and the colored glass comprise post-consumer glass.

14. The method of claim 1, wherein the terrazzo layer has a thickness of approximately ¾ inch.

15. The method of claim 1, wherein the forming cuts in the terrazzo layer comprises cutting the terrazzo layer using a saw to form one or more areas, each having an area of approximately 100 square feet.

16. The method of claim 1, wherein the grinding process comprises:
    performing a first grinding step using a 16/20 diamond grinding disc;
    performing a second grinding step using one or more metal bond grinding discs; and
    performing a third grinding step using one or more ceramic diamond grinding discs.

17. The method of claim 16, wherein the one or more metal bond grinding discs comprise discs of 30, 70, and 120 grit.

18. The method of claim 16, wherein the one or more ceramic diamond grinding discs comprise discs of 50, 100, and 200 grit.

19. The method of claim 16, wherein the grinding process further comprises:
    for each of the 16/20 diamond grinding disc, the one or more metal bond grinding discs, and the one or more ceramic diamond grinding discs used:
       performing a first pass back and forth perpendicular (90 degrees) to a horizontal axis X,
       performing a second pass back and forth along the horizontal axis X,
       performing a third pass back and forth at a 45 degree angle from the horizontal axis X, and
       performing a fourth pass back and forth at a 135 degree angle from the horizontal axis X.

20. The method of claim 1, wherein the portion of the concrete substrate has a thickness greater than approximately 3 inches.

* * * * *